Fig. 1.

INVENTOR.
EVERETT T. SMALL
BY
ATTORNEYS.

INVENTOR.
EVERETT T. SMALL
BY

ATTORNEYS.

INVENTOR.
EVERETT T. SMALL
BY

ATTORNEYS.

INVENTOR.
EVERETT T. SMALL
BY
ATTORNEYS.

Feb. 19, 1963 E. T. SMALL 3,077,682
AUTOMATIC BLADE CONTROL DEVICE FOR BLADE
TYPE EARTH MOVING MACHINERY
Filed Oct. 2, 1961 8 Sheets-Sheet 5

INVENTOR.
EVERETT T. SMALL
BY

ATTORNEYS.

Feb. 19, 1963 E. T. SMALL 3,077,682
AUTOMATIC BLADE CONTROL DEVICE FOR BLADE
TYPE EARTH MOVING MACHINERY
Filed Oct. 2, 1961 8 Sheets-Sheet 6

INVENTOR.
EVERETT T. SMALL
BY

ATTORNEYS.

E. T. SMALL 3,077,682

AUTOMATIC BLADE CONTROL DEVICE FOR BLADE
TYPE EARTH MOVING MACHINERY

Filed Oct. 2, 1961

INVENTOR.
EVERETT T. SMALL
BY

ATTORNEYS.

United States Patent Office 3,077,682
Patented Feb. 19, 1963

3,077,682
AUTOMATIC BLADE CONTROL DEVICE FOR
BLADE TYPE EARTH MOVING MACHINERY
Everett T. Small, 405 S. Orange Grove Ave.,
Los Angeles, Calif.
Filed Oct. 2, 1961, Ser. No. 142,313
10 Claims. (Cl. 37—143)

This invention relates to earth blading apparatus and more particularly to such apparatus which includes a front mounted blade wherein means is provided for vertically adjusting and re-adjusting the blade height relative to the frame of the machine to permit increasing or decreasing the depth of blade cutting.

The invention is adapted for use in connection with an ambulatory frame such as one with front and rear axles and supported by wheels or crawler tracks whereon a blade is mounted in front of the ground supporting members as in a bulldozer type of apparatus.

During an earth or material blading operation, the operator may desire to increase or decrease the depth of blade cut. Due to the forward mounting of the dozer blade of FIG. 1, it is necessary, when increasing the depth of blade cut, to first lower the blade to the desired depth, then raise it above the normal grading position as the machine progresses and then again to lower the blade to the proper grading position to maintain a smooth plane of cut. When decreasing the blade cut, the blade is adjusted in the opposite direction. The amount of vertical adjustment, the timing of making the blade adjustment and the speed rate of the vertical adjustment are all extremely critical for obtaining a smooth plane of blading in all operations where it is necessary to adjust the cutting blade while the machine is in travel motion.

Manually controlled blades require a highly skilled machine operator to perform the exacting requirements for obtaining a smooth cut in the longitudinal plane and can be accomplished only at a relatively slow vehicular travel speed.

The subject device provides:
True cutting in the longitudinal plane—and on a parallel to the cut at the instant of blade adjustment.
Performance at a vehicular travel speed much faster than it is possible with manual controls because of the blading speed being restricted by the operator's physical ability, experience and judgment.

One of the objects of the invention is to provide earth blading apparatus which is provided with raising and lowering means capable of moving the blade generally vertically between certain maximum grading limits, wherein a control device is provided which can be readily triggered or started by the operator when making a blade adjustment. This control device will then proceed through a cycle of movements of the blade vertically relative to the frame to compensate for the change in plane of the wheels or the endless tracks of the vehicle from the plane or level of travel prior to blade adjustment to the subsequent plane or level after the blade is adjusted. The control device is such that the initial step or movement in the blade compensating action is controlled by the operator and the succeeding movement or movements which constitute a cycle or adjustment will be carried on with preciseness under the direction of the control device.

One of the features of the control device is the ability, through a starter mechanism, to vary the initial movement in the cycle of compensating blade movements and to provide a control means which will complete the cycle in increments of maximum grading limits of movement which are proportional not only to the initial degree of movement in the cycle but are also proportional to the forward location of the blade relative to the supporting wheels, tracks or shoes, the latter three elements being referred to hereinafter as ground engaging means.

Another feature of the device is the ability to raise the blade automatically when the blade encounters an overload. Whenever the load imposed on the vehicle increases sufficiently to cause the engine to slow down from its governed operating speed setting, the control device automatically will cause the blade to raise sufficiently to relieve itself of the overload and enable the tractor engine to regain its governed operating speed and at the same time initiate a subsequent cycle of blade adjustments.

The above and other objects will more fully appear from the following description in connection with the accompanying drawings.

Figure 1:
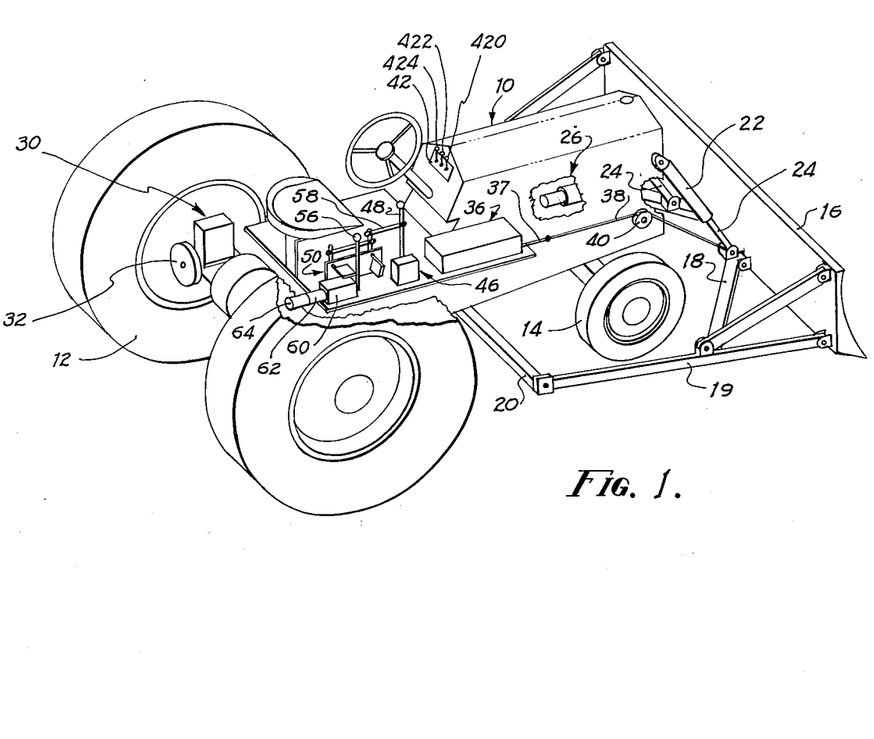
FIG. 1 is a perspective view of a wheeled tractor and bulldozer with an embodiment of the invention mounted thereon.

In FIG. 1 there is shown an adaption of my invention to a bulldozer type of blade mounted on a wheeled tractor, it being understood that it adapts in like manner to an angle blade type dozer or to a crawler type tractor equipped with either types of blades mentioned above. The tractor 10 is shown with rear wheels 12 and front wheels 14. A dozer blade 16 is attached to push beam members 19 connected to a tractor cross member 20. There is shown one of a pair of blade raising and lowering cylinders 22 with complementary piston rods 24 which are respectively connected to the forward end of the tractor 10 and an inner member 18 of push beam member 19 (the far side not being shown). The tractor engine governor is indicated diagrammatically at 26.

Mounted on the tractor 10 is a timer unit 30 which is shown having a drive wheel 32 urged against one of the rear ground wheels 12. Also mounted on the tractor is a gauge control assembly 36 actuated by means of a cable 38 which is supported at the forward end of the tractor by a sheave 40, the forward end of the cable being fastened to inner member 18 of push member 19. A switch panel 42 containing control switches for the mechanism is mounted on tractor 10 in a location convenient to the operator.

A starter control assembly 46 is shown mounted on tractor 10 with an operator's starter lever 48. A blade speed regulator 50 for regulating the movement of a tractor valve lever 56 is connected to starter lever 48 by means of a rod 58. Tractor valve lever 56 actuates a tractor hydraulic valve 60 which controls the movement of the blade lift cylinders 22 on manually controlled dozers. Valve solenoids 62 and 64 are shown mounted on the hydraulic valve 60 for performing vertical adjustment of blade 16 in the operation of this device. The starter control lever 48 is suitably connected with the tractor hydraulic system and with other mechanism to be described below for initiating and controlling the interval of incremental vertical movement of the blade 16 to cause the blade to compensate vertically for the variations in elevation of the tractor 10 relative to a ground elevation at which the working edge of the blade 16 is intended to operate.

The prime functions of the major assemblies described in this invention are as follows:

The starting lever assembly 46, 48 starts and controls the initial blade adjustment and simultaneously establishes the vertical speed of the blade for the duration of the cycle.
The timer unit 30 activates the blade re-adjustment at the proper time during the cycle necessary for a smooth blade cut.
The gauge control assembly 36 determines the amount of blade movement needed in re-adjustment operations during the cycle and stops the blade vertical movement when the proper amount of travel has been reached.

The relationship between the starter control lever 48 and other control mechanism will be brought out below.

*Gauge Control Box*

Figure 2:
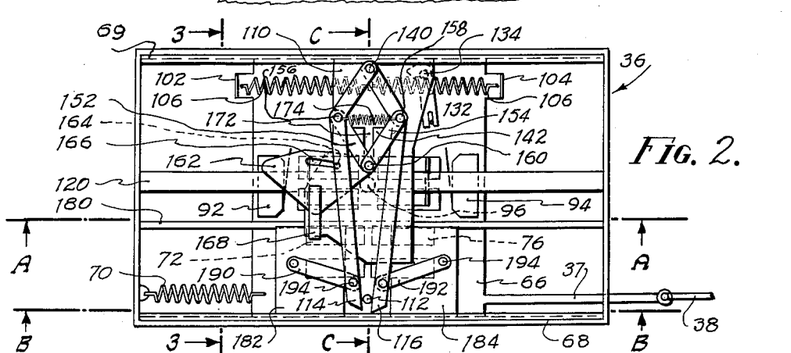
FIG. 2 is a plan view of the gauge box for the blade compensating means with a portion of the box removed.

FIG. 2 shows the gauge control assembly box 36 of FIG. 1 having a cable rod 37 and gauge cable 38, the gauge box and its enclosed mechanism being shown in FIG. 2 in a plan view. In FIG. 3 the gauge box 36 is shown as a transverse vertical sectional view. The outer end of cable rod 37 is connected to the cable 38 shown in FIGS. 1, 2 and 15 and the other end is connected to a switch plate 66 which is slidable in guides 68, 69 shown in the sides of the gauge box 36 in FIG. 3. A tension spring 70 is fastened to a switch plate 66 and to gauge box 36 for maintaining tension on cable 38. The switch plate 66 carries a pair of switches 72 and 74 at one end of the medial portion thereof and an oppositely positioned pair 76 and 78 shown in FIG. 2B. The switch plate 66 also carries a pair of switches 80 and 82 at one side thereof and another pair of switches 84 and 86 at the other side shown in FIG. 2A. The switch plate 66 as best shown in FIG. 2 also carries oppositely disposed limit switches 92 and 94. Shown in FIG. 2 are two plate extensions 102 and 104 on switch plate 66 with opposing springs 106 mounted thereon which anchor to bracket 108 shown in FIG. 3 for centering a sliding gauge frame 110 with respect to switch plate 66.

At the approximate center of switch plate 66 is mounted a spring ball mechanism 96 (FIG. 2C, also FIGS. 2 and 3) enclosing a spring 98 pressing a ball 100 outwardly which engages a notch 101 of sliding gauge frame 110 and centers the gauge frame 110 with respect to the switch plate 66. A vertical bar 112 is mounted on switch plate 66 at right angles for spacing gauge arms 114 and 116 mounted on gauge assembly 110 during the initial adjustment of dozer blade 16 of FIG. 1.

A supporting rod 120 secured at both ends in housing 36 has a sliding block 122 shown in FIG. 3 mounted thereon which is a part of gauge frame 110. Extending from block 122 at right angles to the supporting rod 120 is sliding plate 124 the outer end of which slides in a groove provided in side plate 69. Mounted on the sliding plate 124 is a switch contact plate 126 which is part of gauge frame 110 and contains the centering notch 101 shown in FIG. 2C. On plate 124, as shown in FIG. 3, is mounted a solenoid 130 for locking the sliding plate in operation which will be explained later. The solenoid 130 actuates a lever 132 on a hinge pin 134 which is mounted on the sliding plate 124 as shown in FIGS. 2 and 3. Also mounted on the sliding plate 124 is a bar 136 shown in FIG. 3 for actuating limit switches 92 and 94. On the opposite side of plate 124 is mounted a bracket 138 and a hinge pin 140 on which is mounted a pair of gauge arms 114 and 116.

Mounted on the sliding block 122 opposite the sliding plate 124 is a guide plate 142 and spacers 144, shown in FIG. 3. Mounted on the guide plate 142 is a support plate 146 on which is mounted a solenoid 150 for holding the gauge arms in an off-center position during the cycle.

Gauge arms 114 and 116 shown in FIGS. 2 and 3 are hinge-mounted on pin 140. The pivotal links 152 and 154 attach to guide arms 114 and 116 respectively by means of pins 156 and 158 and are commonly connected by a guide pin 160. A lock plate 162 is pivotally mounted on a guide pin 160 and is slot-mounted on a stationary anchor pin 164. In the cycle of operations, guide arms 114 and 116 are locked in a separated position by lock plate 162 which is temporarily clamped between the support plate 146 and the upper end of a clamp lever 168 (FIGS. 2 and 3). The lower end of the clamp lever 168 is actuated by a solenoid 150.

Figure 4:
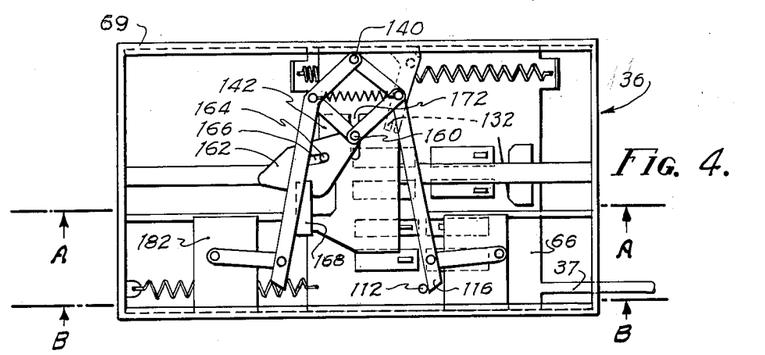
FIG. 4 is a view similar to FIG. 2 with portions of the control mechanism in position for vertical blade adjustment in one direction.
Figure 4A:
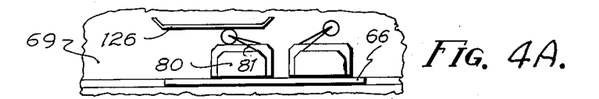
FIG. 4A is a fragmentary view taken approximately on the line A—A of FIG. 4.
Figure 4B:
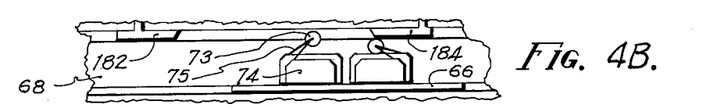
FIG. 4B is a fragmentary view taken approximately on the line B—B of FIG. 4.

Guide plate 142 contains an aperture 172 shown in FIGS. 2 and 4 engaging and guiding the movement of guide pin 160. The contour of the aperture 172 is of such configuration to provide the proper adjustment of a switch plate 182 shown in FIGS. 4B and 5B as determined by the ratio of the distance from the blade 16 in FIGS. 1 and 15 to the front ground support to the rear ground support of the ground-engaging means as will be more fully explained. A spring 174 is mounted on guide arm 114 and connecting with guide arm 116 tends to maintain the guide arms in a closed position.

A track bar 180 shown in FIGS. 2 and 3 is secured at both ends to housing 36 and provides one trackway support for sliding the switch plates 182 and 184, the opposite track being a groove in guide bar 68. The pivot extensions 186 and 188 shown in FIG. 3 secured to guide arms 114 and 116 respectively extend downwardly supporting pivotally mounted links 190 and 192 which connect switch plates 182 and 184 to guide arms 114 and 116, shown in FIGS. 2 and 3. Each end of pivotal links 190 and 192 is mounted on hinge pins 194.

Electric relays 200, 202, 204, 206, 208, 210 and 212, shown in FIGS. 3 and 13, will be explained later.

Starter Lever Assembly

Figure 6:
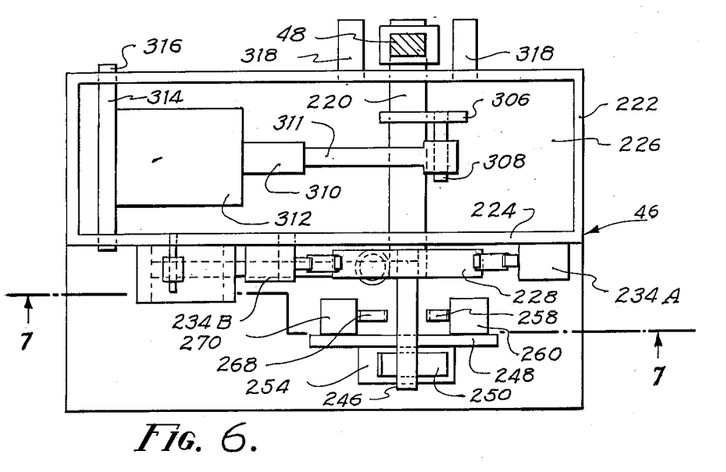
FIG. 6 is a plan view partially in section of the control starter for the blade compensating control mechanism with the housing cover removed.
Figures 6A, 7:
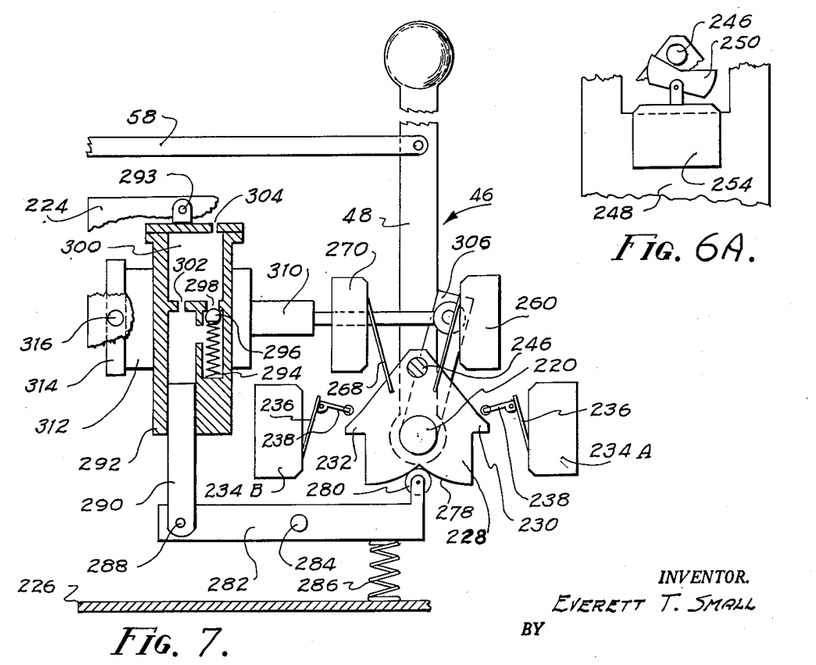
FIG. 6A is a side elevational detail of a rocker bar switch arrangement.
FIG. 7 is a sectional view generally along the line 7—7 of FIG. 6.

The starter lever 48 for the control device 46 in FIG. 1 is shown in FIGS. 6 and 7 and is mounted on a pivot 220 which in turn is mounted in upright plates 222 and 224 on base plate 226 as shown in FIG. 6. Fastened to the inner end of pivot 220 is a cam plate 228 (shown in FIG. 7) which has two peripheral lugs 230 and 232 located on opposite sides thereof for actuating the one-way switches 234A and 234B respectively as shown in FIGS. 6, 7 and 13. The one-way switches 234A and 234B of FIG. 7 have switch arms 236 on the outer end of each of which is a hinge mounted roller assembly 238 biased to a position at right angles to arm 236 by a small torsion spring (not shown), which permits the roller assembly 238 to hinge backward when the roller is contacted in the opposite direction (clockwise relative to switch 234A and counterclockwise relative to switch 234B), and does not activate the switch on which it is mounted.

At the top of the cam plate 228 shown in FIGS. 6 and 7 is an extension bar 246 for operating electrical switches mounted on the vertical housing plate 248 which in turn is mounted on the base plate 226. Rotation of the cam plate 228 causes the extension bar 246 to contact a rocker bar 250 of a two-way switch 254 which is mounted on the housing plate 248. Rotation of the cam plate 228 in a clockwise direction also causes bar 246 to depress the switch arm 258 of a double circuit switch 260 mounted on the housing plate 248, whereas rotation of plate 228 in a counterclockwise direction causes bar 246 to depress a switch arm 268 of a double circuit switch 270 also mounted on the housing plate 248.

The lower surface of the cam plate 228 is a peripheral cam notch 278 shown in FIG. 7 for centering the starter lever 48. The mechanism for urging starter lever 48 to neutral position comprises a roller 280 on one end of a bar 282 which is hinged on a pin 284 which is in turn mounted on the housing plate 224. A compression spring 286 mounted on the base plate 226 presses against the pivotal bar 282, urging the roller 280 upward into the converging faces of the cam notch 278 which is the neutral position for the starter lever 48 on the pivot 220.

On the opposite end of the pivotal bar 282 is a pin 288 attached to a piston 290 which operates in a dash pot housing 292 hingedly mounted on the housing plate 224 by a pin 293. Dash pot 292 contains a spring 294 which urges a ball check 296 against a ball seat 298 in a reservoir 300 in the upper portion of the housing 292 shown in FIG. 7. Rotation of the cam plate 228 from neutral position causes the piston 290 to force oil through a restricting orifice 302 which retards rotational movement of the cam plate 228. A quick movement of the piston 290 in the opposite direction is permited by oil flowing to the piston through both orifice 302 and the ball checked seat 298 while permitting air to enter the compartment 300 through a vent orifice 304.

Mounted on the inner section of the pivot shaft 220 shown in FIG. 6 is a crank arm 306 having a crank pin 308 to which is pivotally connected an extension rod 311 and a solenoid armature 310 of an overload solenoid 312. Solenoid 312 is mounted on a pivotal base 314 which has a pair of pins 316 pivotally mounted in properly aligned holes in housing plates 222 and 224 respectively. Extending outwardly from the housing plate 222 shown in FIG. 6 are two lugs 318 for limiting the movement of the starter lever 48.

Figure 8:
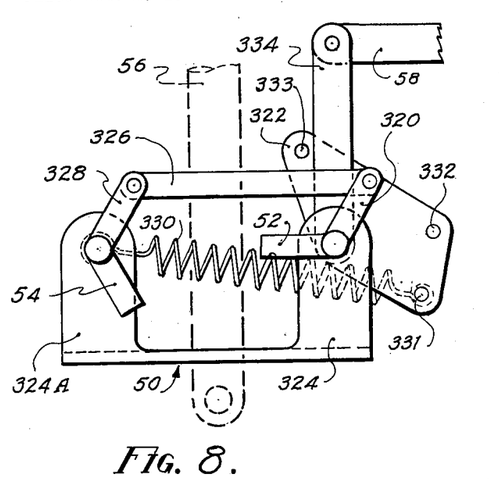
FIG. 8 is a side elevational view of the tractor valve lever regulator adjusted in the position for the blade lowering cycle.
Figure 9:
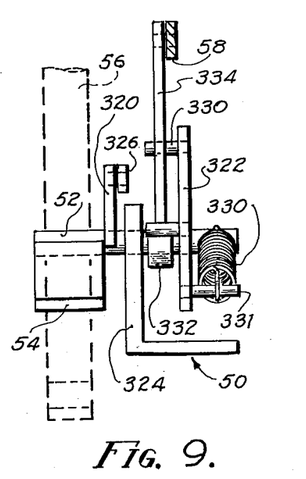
FIG. 9 is an end elevational view of the structure shown in FIG. 8.

The regulator 50 for limiting the vertical speed of the blade 16 is shown in FIGS. 1, 8 and 9. A pivotal stop member 52, including the lever 320 and member 322, is mounted for rotation in a support bracket 324. A connecting rod 326 pivotally connects the lever 320 with a lever 328 of the opposing rotary stop member 54 mounted on the support bracket 324A. A tension spring 330 is anchored between the pivotal section of the stop member 54 and a pin 331 on the lower section of member 322 in a position suitable to provide an over-center type movement in operation. The upper section of member 322 contains extension pins 332 and 333 properly spaced to provide engagement with an activating lever 334 which is hingedly mounted relative to stop member 52 and pivotally connects to starter lever connecting rod 58.

The operation of starter lever 48 and its several associated components and functions will be brought out below.

Timer Assembly

Figure 10:
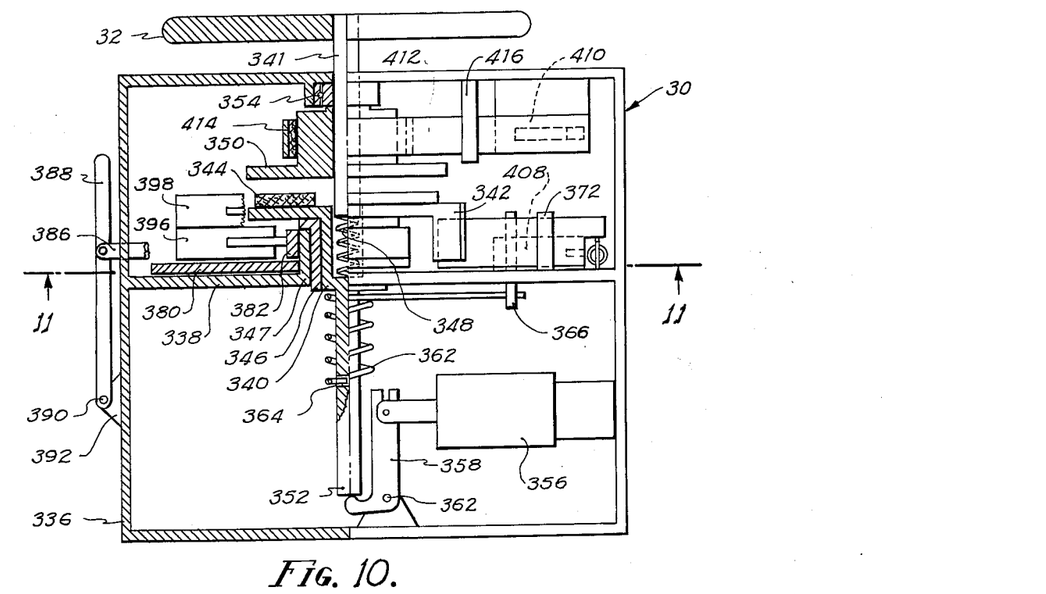
FIG. 10 is a view partially in horizontal section and partially in plan of the timing device for the control mechanism.
Figure 11:
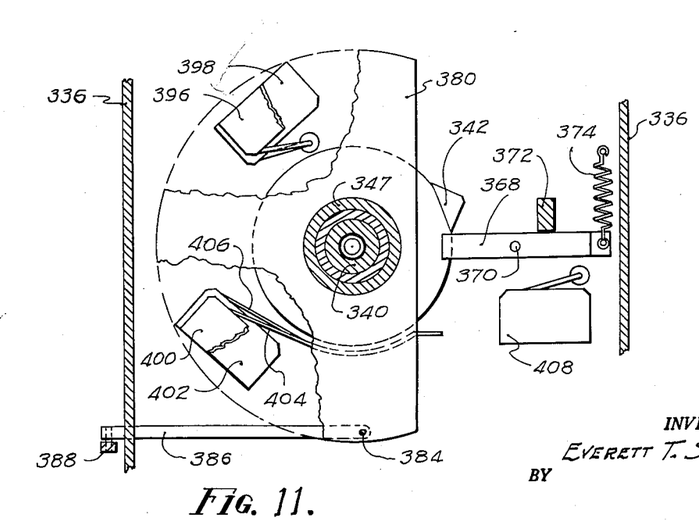
FIG. 11 is a view partially in vertical section taken approximately on line 11—11 of FIG. 10.

In FIGS. 10 and 11 there is shown the timer unit 30 indicated in FIG. 1. The timer unit 30 includes a housing 336 having an inner housing plate 338 enclosing a rotary cam body 340 having a single lobe 342 and having a friction drive disc 344. The cam 340 is supported in a bushing 346 having a bushing receptacle 347 extending from the housing plate 338 as shown in FIG. 10. The cam body 340 contains a spring 348 which presses against a shaft 341 carrying a driving disc 350, said shaft being supported in a bearing 354 mounted in housing 336.

In the lower end of housing 336 as viewed in FIG. 10 is mounted an electric solenoid 356 which is connected to an actuating lever 358 which is pivotally mounted on a pin 362 supported by the housing 336. When energized, solenoid 356 causes lever 358 to move shaft 352, which carries the cam body 340 longitudinally for engagement with driving disc 350 connected through the shaft 341 with the drive wheel 32 which is in engagement with the adjacent ground wheel 12 shown in FIG. 1.

As viewed in FIG. 11, the direction of rotation of the cam body 340 through its driving connection with the ground wheel of the apparatus is counter-clockwise. When the friction disc 344 is disengaged by the cam 340 to cut off the ground wheel drive connection, the cam 340 is reversely rotated by a torsion spring 362 (shown in FIG. 10) having one end anchored in a recess 364 in the cam shaft 352 and the opposite end pressing against an anchor pin 366 mounted on the housing plate 338. The end of cam lobe 342 is adapted to engage one end of a pivoted stop member 368 best shown in FIG. 11. The stop member 368 is intermediately pivoted at 370 and the right end of the stop member 368 is urged against a stop bracket 372, mounted on the housing plate 338, by a spring 374 attached to the housing plate 338 and stop member 368 shown in FIG. 11.

A switch plate 380 shown in FIGS. 10 and 11 is mounted for rotation on the cam receptacle 347 between plate housing 338 and a holding collar 382 secured to the receptacle 347. Suitably mounted on the switch plate 380 is a pair of switches 396 and 398 at one point about the cam unit and a second pair of switches 400 and 402 having switch levers 404 and 406 respectively positioned at another point about the cam.

In FIG. 11 the lower segment of the switch plate 380 contains a pin 384 on which is mounted adjustment rod 386 which extends through the housing 336 and pivotally connects to an adjustment lever 388. One end of lever 388 hinges on a pin 390 mounted on a housing lug 392 shown in FIG. 10. Lever 388 and its connecting linkage is for providing an adjustable means to advance the timing of the device for high speed blading operations.

There is a safety switch 408 in FIG. 11 located under stop member 368 and mounted on the plate 338 which is engaged by reverse movement of the stop member 368. A cut-out switch 410, mounted on housing 336 as shown in FIG. 10, is engaged by an arm 412 of a friction drag brake 414 mounted on a driving drum 350 when the drum rotates in reverse direction. A stop lug 416 mounted on housing 336 restricts movement of the arm 412 when the tractor is moving forward.

Overload Control

Figures 12, 14:
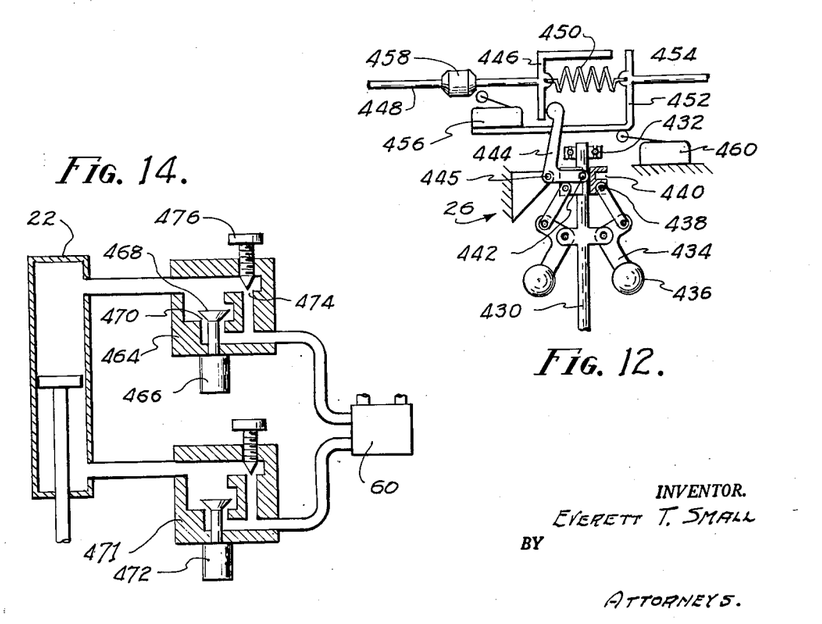
FIG. 12 is a partially diagrammatic view of a typical engine governor with control switches attached.
FIG. 14 is a diagrammatic view of a hydraulic type of blade vertical speed regulator.

FIG. 12 is a schematic view showing the general features of a tractor engine governor which regulates the amount of fuel supplied to the engine in operation and is well understood in the field. A governor drive shaft 430 mounted on a bearing 432 is gear driven from the tractor engine and rotates hinged linkages 434 carrying flyball weights 436 which are hingedly connected with suitable linkage to a slide member 438. Sliding in a retaining groove 440 of member 438 is a pin 442 mounted on one end of a bell-crank 444 which is pivotally mounted on the housing 26, shown also in FIG. 1, by a pin 445. The other end of bell-crank 444 rests against a fuel rod member 446 of a fuel control rod 448. A spring 450 connects to the fuel rod member 446 and to a bracket 452 mounted on a control rod 454. An overload switch 456 which is a part of this invention and also shown in FIG. 13 is mounted on the control rod bracket 452 and is actuated on tractor overloads by a collar 458 mounted on the fuel rod 448. A cut-out switch 460 is mounted on the housing 26 and is opened by the bracket 452 at engine idle speed for breaking the circuit to the overload solenoid 312 of FIG. 13.

Figure 13:
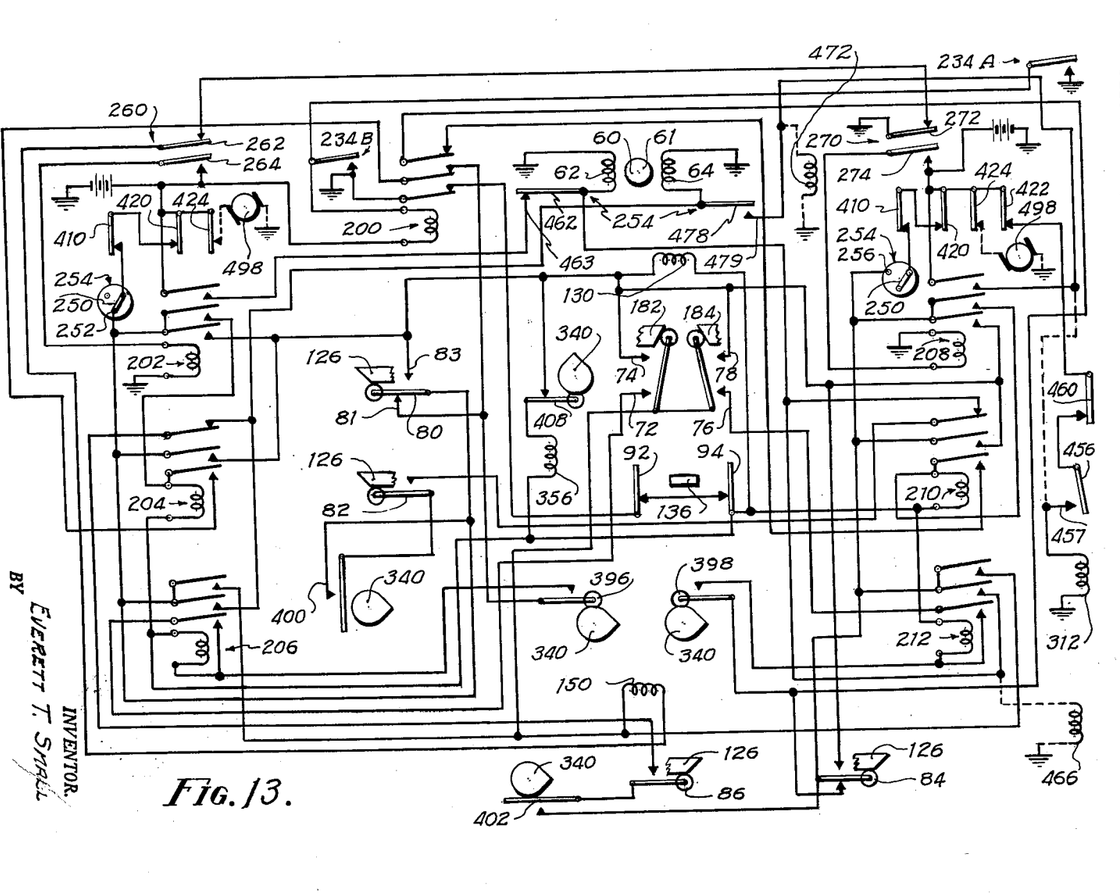
FIG. 13 is a diagrammatic view of the control mechanism and its electrical circuits.
Figures 15, 16:
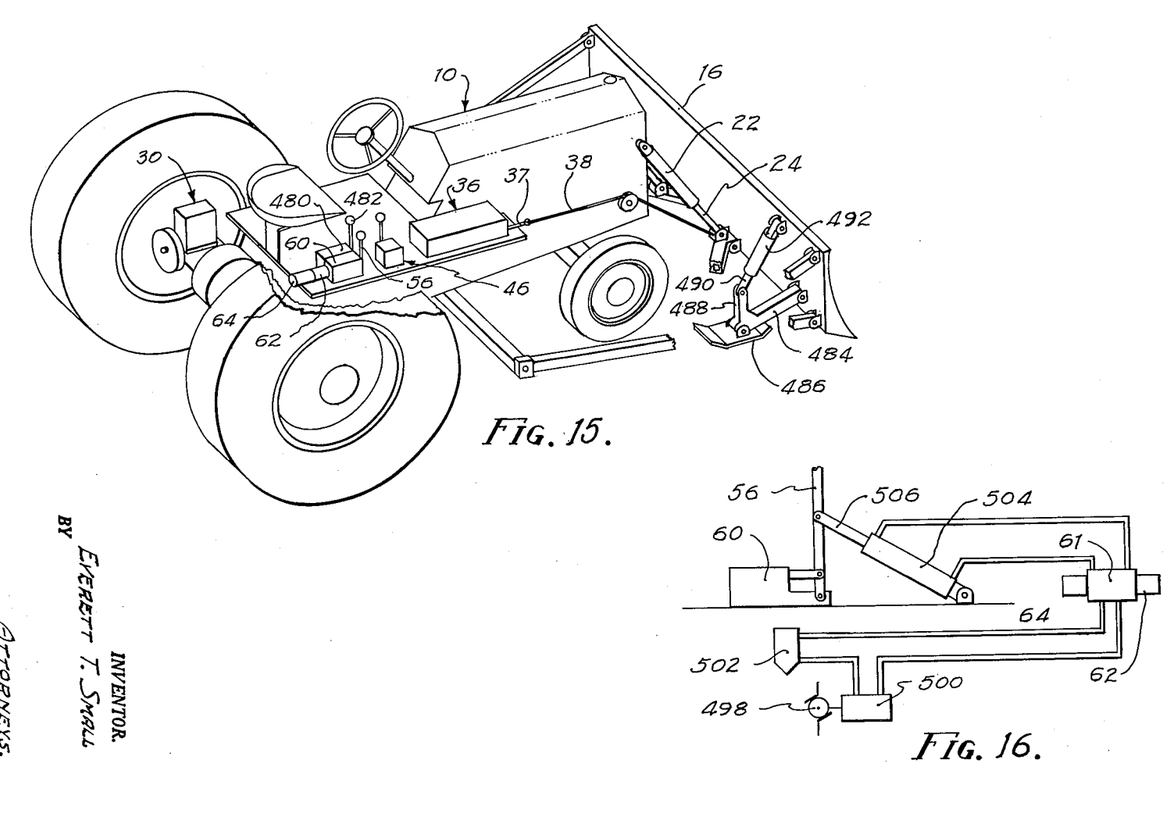
FIG. 15 is a perspective view of a tractor dozer with another embodiment of the invention of blade control mounted thereon.
FIG. 16 is a diagrammatic view of an auxiliary power actuating mechanism for the tractor valve lever.

Control switch 420 shown in FIG. 13 is mounted on the switch panel 42 shown in FIG. 1 and connects the battery to the cut-out switch 410 and rocker actuated switch 254 shown in FIGS. 6 and 13. The overload switch 422 connects the battery circuit to the cut-out switch 460 and solenoid switch 456 shown in FIGS. 12 and 13. Switch 424 in FIG. 13 connects the battery circuit to an auxiliary drive mechanism such as shown in FIG. 16. Shown in FIG. 13 is a dotted line connecting contact 457 of overload switch 456 to solenoid 64 as an alternate means of enabling the blade 16 to be raised automatically in overload conditions when solenoid 312 is not provided.

*Operation*

Operation of the mechanism will be explained in connection with the mechanical structure described above and with the wiring diagram set forth in FIG. 13.

The blade 16 is initially set at the approximate blading height by the starter lever 48 which activates the tractor hydraulic control valve in a method explained later, the valving not being shown since it is conventional and well understood in the field.

In the operation of tractor dozing, it is frequently necessary to adjust the depth of blade cut. Starting the blade in the same plane as the tractor ground wheels with all control circuits in open position, the only act which must be performed by the operator is to adjust the blade to the desired depth of cut, which in turn begins the cyclical actuation of the control mechanism and its associated timer and components which will automatically re-adjust the blade properly. The location of the blade forward of the front ground support with respect to the distance between the front and rear ground supports determines the proper amount of blade lowering and raising movement which must take place in a completed cycle. For example, if the tractor front wheels of FIG. 1 are located midway between the rear wheels 12 and blade 16, then the first readjustment of the blade is twice the amount of the initial adjustment and the second re-adjustment is equal the amount of the initial adjustment which was adjusted by the operator. The proportional vertical movement of the blade in its lowering and raising cycle in this invention is governed by the positioning of sliding contact plates 182 and 184 and its connecting linkage of guide arms 114 and 116 which is determined by the configuration of the aperture in guide plate 142 shown in FIGS. 2 and 4.

The proper timing of the blade raising and the second blade lowering in the cycle of blade re-adjustment is essential for obtaining a smooth cut surface in the longitudinal plane. In the above example, when the blade is lowered in operation it will cut in a plane parallel to the ground plane of the tractor as the tractor progresses forward until the tractor front wheels of FIG. 1 start lowering into the new cut, at which time the blade must be raised in order to compensate for the slightly downward pitch of the tractor. When the rear wheels start lowering into the new cut, the blade must be lowered to the normal ground plane of the tractor within the time that the rear wheels finish lowering into the cut for producing a uniform longitudinal plane. The timing of the blade re-adjustment in the cycle is determined by the location of the switches mounted on switch plate 389 in FIG. 11 being activated by rotation of cam body 340 of FIG. 10.

The vertical blade speed is another important factor in obtaining a true blading plane parallel to the plane cut previously to blade adjustment when the blade is located forward of its ground supports. In the foregoing example, the vertical blade speed for the first re-adjustment of the blade must be two times the vertical blade speed of the initial adjustment and the same as the second re-adjustment of the blade. The proper vertical blade speed for each cycle of operations is provided by the regulator 50 shown in FIGS. 1, 8 and 9.

The initial portion of the lowering and raising cycle is determined by the skill of the operator and this skill only need be sufficient to adjust the blade by lever 48 to the desired depth of cut then release the starter lever. As long as the hand or starter lever 48 is held in a blade adjusting position the blade will move in the desired direction but as soon as the lever 48 is released it will return to a neutral position such as shown in FIG. 7 under the influence of the spring 286, but the control mechansim and timer will continue to function and re-adjust the blade to return it to the desired blading height automatically.

When the operator desires to increase the depth of blade cut during a blading operation, the hand starter lever 48 is pushed forward which rotates arcuate plate 228 clockwise as viewed in FIG. 7 and closes switch 234B thus energizing relay 200 shown in FIG. 13 which neutralizes any closed circuits remaining from the previous blade adjustment. Continued rotation of plate 228 permits switch 234B to close and extension bar 246 depresses one end of over-center type rocker bar 250 of switch 254 closing the circuit to contact 252 and opening contact 256 shown in FIG. 13. Rocker bar 250 remains in one position until it is moved mechanically by starter lever 48 to adjust the blade in the opposite direction. Also, continued rotation of plate 228 activates double circuit switch 260 shown in FIGS. 6, 7 and 13 which opens the circuit of solenoid 150 by opening switch lever 262 and simultaneously closing switch lever 264 thus energizing relay 202 which closes the circuit of valve solenoid 62 and energizes relay 204 for subsequent action. Energized solenoid 62 activates control valve 60 and causes blade 16 to lower. Movement of hand lever 48 is retarded by resistance of piston 290 and is stopped mechanically by lug 318 on housing 222 shown in FIG. 6.

At the same time, relay 202 shown in FIG. 13 also energizes two other solenoids which continue in holding position for the remainder of the cycle, one being solenoid 130 shown in FIG. 13 which locks gauge frame 110 in the gauge box 36, the other being solenoid 356 of FIG. 10 which activates cam 340 in timer box 30 and starts the cam to rotate. In the meantime, the initial movement of starter lever 48 and rod 58 actuates lever 334 of FIG. 8 which is hinged on stop member 52 shown in FIG. 1. If the direction of the initial movement of lever 48 is opposite the direction of the previous initial adjustment of the blade, actuating lever 334 will contact extension pin 332 causing member 322 to start rotating clockwise as viewed in FIG. 8 until holding spring 330 has ceased stretching and starts to contract, whereupon spring 330 causes member 322 to continue rotation until it is stopped by link 326 contacting stop member 52. The mechanism of regulator 50 holds stop members 52 and 54 in one of two positions and in the blade lowering cycle stop member 54 is held in a horizontal plane whereas stop member 52 is held in a downward slope position for the duration of the blade lowering cycle. Member 322 permits starter lever 48 to return to neutral position without changing the position of stops 52 and 54.

Stop members 52 and 54 shown in FIG. 8 are located fore and aft of valve lever 56. In the blade lowering cycle, stop member 52 is adjusted to limit the forward stroke of valve lever 56 as shown in FIG. 8 resulting in the vertical lowering speed of blade 16 at one half the blade raising speed without restricting the blade raising operation which is performed automatically in the subsequent re-adjustment cycle by solenoid 64 activating tractor valve 60.

The lowering movement of blade 16 moves cable 38, rod 37 and switch plate 66 to the right as viewed in FIG. 4. Movement of bar 112 mounted on plate 66 causes gauge arm 116 to hinge on pin 140 and causes the linkage connected guide pin 160 to slide in the aperture 172 of plate 142 which through connecting linkage moves switch plate 182 to the left.

Release of the starter lever 48 stops the blade lowering and causes the closing switch contact 262 of FIG. 11 which is a part of switch unit 260 and this energizes solenoid 150 which locks the gauge arms 114 and 116 in position as shown in FIG. 4. Solenoid 150 remains energized for the duration of the cycle. In this position, the roller 73 and arm 75 of switch 74 shown in FIG. 4B have moved out of contact with plate 182 which results in the closing of switch 74, maintaining a closed circuit to gauge arm solenoid 150. Relay 204 remains energized through the closed circuit of contact 81 in switch 80 shown in FIGS. 4A and 13 which maintains a closed circuit to solenoid 130 on gauge frame 110 and solenoid 356 of timer cam 340.

As the cam 340 rotates, it will close switch 396 of FIG. 11 and will activate relay 206 and energize the circuit from said relay to valve solenoid 64 and start to raise the blade 16. The cam solenoid 356, gauge arm solenoid 150, gauge frame solenoid 130 and relay 206 remain energized.

Figure 5:
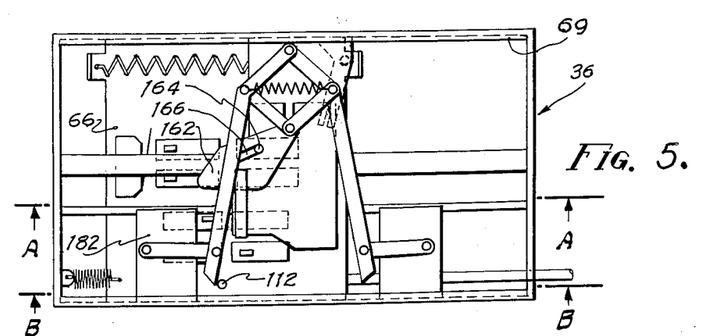
FIG. 5 is a view similar to FIG. 2 with portions of the control mechanism in position for vertical blade adjustment opposite to that shown in FIG. 4.
Figure 5A:
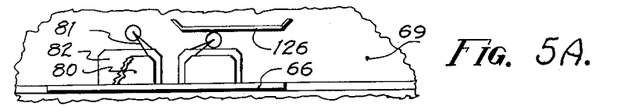
FIG. 5A is a fragmentary view taken approximately on the line A—A of FIG. 5.
Figure 5B:
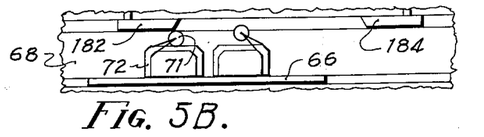
FIG. 5B is a fragmentary view taken approximately on the line B—B of FIG. 5.

The raising of the blade 16 causes switch plate 66 of gauge box 36 to move switch 80 from contact plate 126 shown in FIG. 5A which opens the circuit through switch contact 81 of FIG. 13 which de-energizes relay 204; however the circuit for holding relay 206 energized is being maintained by switch 72. When switch plate 66 reaches the position shown in FIG. 5B, switch roller 71 will engage switch plate 182 causing switch 72 to open and break the circuit to relay 206. This de-energizes the blade valve solenoid 64 and stops blade raising movement. At this point, the cam solenoid 356, gauge arm solenoid 150 and gauge frame solenoid 130 remain energized by the circuit through switch contact 83 of of switch 80 also by switch 78 shown in FIG. 13.

The rotating timer cam 340 closes switch 400 to energize the blade lowering valve solenoid 62. This solenoid is in circuit with an inactive relay 210 of FIG. 13 and switch 82 due to the closing of the switch 400 which remains closed by the rotating cam.

Figure 2A:
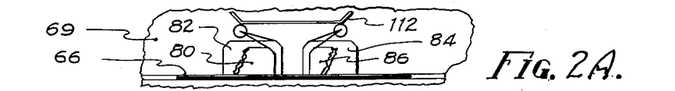
FIG. 2A is a fragmentary view taken approximately on the line A—A of FIG. 2.
Figure 2B:
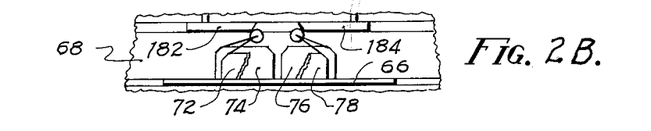
FIG. 2B is a fragmentary view taken approximately on the line B—B of FIG. 2.
Figure 2C:
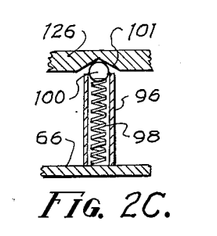
FIG. 2C is an enlarged fragmentary detail in vertical section along line C—C of FIG. 2 of a spring pressed ball unit for yieldably holding relatively movable parts.
Figure 3:
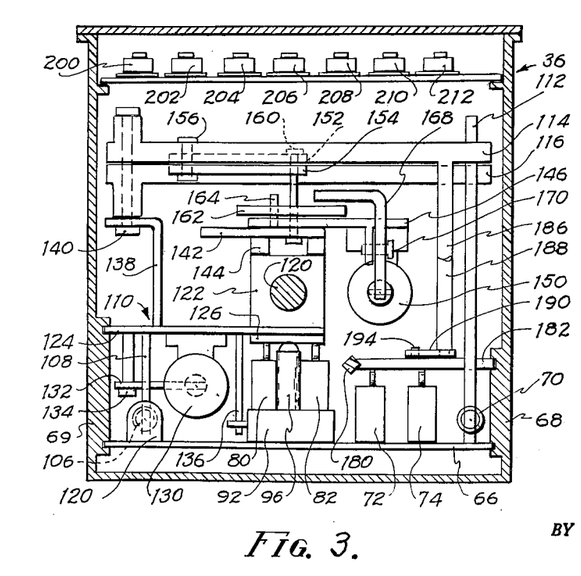
FIG. 3 is a transverse vertical section taken approximately on the line 3—3 of FIG. 2.

During this second blade lowering operation, switches 80 and 82 on switch plate 66 are moving toward the center position and when the arms of said switches 80 and 82 break contact under the contact bar 126 as shown in FIG. 2A, switches 80 and 82 are opened and all circuits are broken at the instant that spring ball 100 engages in notch 101 of plate 126 shown in FIG. 2C thereby stopping the lowering action of the blade 16. This action deenergizes gauge frame solenoid 130 and gauge arm solenoid 150 which permits gauge arms 114 and 116 to return to neutral position by spring 178. Since the circuit to the cam solenoid 356 is also broken, torsion spring 362 shown in FIG. 10 will cause the cam to return to its starting position as illustratde in FIG. 11. Therefore the blade will remain in a fixed vertical position until the operator of the tractor is again ready to make another adjustment of the blade.

The right hand portion of the circuit shown in FIG. 13 controls the blade raising cycle and functions in similar fashion to that in the left hand side of the diagram. The blade raising cycle is accomplished by pulling the hand lever 48 in the direction opposite to that required for the lowering cycle described above.

Switch 410 shown in FIGS. 10 and 13 is a cut-out switch for preventing the automatic features from functioning when the switch 410 is open. In reverse movement of disc 350, switch 410 is held in an open position by arm 412 of friction drag brake 414 mounted on driving disc 350. In forward movement of the tractor, switch 410 remains closed and arm 412 is restricted from rotation by stop lug 416 mounted in housing 336. This provision enables the operator to back-trowel with the blade without activating the automatic control mechanism.

In the progress of tractor operations, the tractor load often increases and causes the engine to slow down from its governed speed. In earth blading operations, the operator endeavors to raise the blade when the tractor overloads are encountered to prevent the engine from stalling. This invention provides a means for raising the blade automatically when the tractor encounters overloads. As the tractor engine slows down, the upper portion of crank 444 moves to the right, as viewed in FIG. 12, due to decrease of centrifugal force exerted by the governor flyballs 436 and connecting linkage. During this time, fuel rod 448 and collar 458 are moved to the right by tension of spring 450. Collar 458 closes switch 456 which energizes solenoid 312 shown in FIGS. 6 and 7 which activates lever 48 and causes the blade 16 to start raising. The movement of fuel rod 448 to the right increases the fuel to the tractor engine thereby permitting it to increase its speed which moves the governor linkage to its former setting thus breaking the circuit through switch 456 and halting the raising movement of blade 16.

When idling the engine, the operator moves control rod 454 to the left as viewed in FIG. 12 which opens cut-out switch 460 which makes solenoid 312 inoperative.

In FIG. 14 is shown a means to regulate the vertical speed of blade 16 hydraulically in cases where installation of a mechanical regulator shown in FIG. 8 is impractical. In the hydraulic line connecting the upper end of cylinder 22 and tractor control valve 60 shown in FIG. 1 is a solenoid valve 464 shown diagrammatically in FIG. 14 located to permit full flow of oil from cylinder 22 to valve 60 when the valve 464 is open. Valve 464 contains a solenoid 466 attached to a poppet valve 468 which closes against a seat 470 when solenoid 466 is energized. When solenoid 466 is energized during the cycle sequences, oil flow from valve 60 to cylinder 22 is restricted by flowing through a by-pass channel and orifice 474 and needle stem 476 which is adjustable to provide proper reduction of lowering speed of blade 16.

The hydraulic line connecting the lower section of cylinder 22 to valve 60 in FIG. 14 is in circuit with the poppet valve 468 which contains a solenoid 472 and is a duplicate of valve 464. The circuit for the solenoid 466 as shown in dotted lines in FIG. 13 connects in parallel with valve solenoid 62 also shown in FIG. 1, whereas solenoid 472 connects with valve solenoid 64.

In the lowering cycle of blade 16, solenoid 466 in FIG. 14 closes valve 468 simultaneously with valve solenoid 62 thereby restricting the oil flow from valve 60 to cylinder 22 and slows the lowering speed of blade 16 in both the initial lowering and the final re-adjustment lowering of the blade 16 explained previously, but permits full flow of oil in the opposite direction during the first re-adjustment in the cycle when the blade is raising.

In FIG. 15, there is shown the adaption of my invention wherein the front ground support for the blade during blading operations is a pair of skid shoes 486 and the rear ground support is the tractor. In this arrangement the main blade cylinders 22 attached to tractor 10 for lifting blade 16 shown in FIGS. 1 and 15 are hydraulically connected to a valve 480 actuated by a hand lever 482 shown in FIG. 15. The main cylinders 22 are used for lifting and lowering the blade 16 and its attached linkage in high lift range for transport but piston rods 24 float freely in cylinders 22 by the proper positioning of valve lever 482 after the blade is lowered for blading operations.

The front ground support mechanisms (the far side not being shown) consists of bell-crank 484 pivotally mounted on blade 16 and connected to ground shoe 486. The upright portion 488 of bell-crank 484 is pivotally connected to the lower end of a piston rod 490 in a cylinder 492, the upper end of the latter being connected to the upper edge of blade 16. Cylinder 492 is hydraulically connected to valve 60 in such manner to cause piston rod 490 to retract into cylinder 492 for lowering the blade 16 with respect to ground support shoe 486, the blade control cycle of operations being described previously.

Diagrammatically illustrated in FIG. 16 is an auxiliary drive for actuating control lever 56 and valve 60 shown in FIGS. 1 and 16. In this adaptation, valve solenoids 62 and 64 shown in FIGS. 1, 13, 15 and 16 are mounted on control valve 61 which is also valve 60 of the previous embodiment. A drive motor 498 connects with switch 424 shown in FIG. 13 in dotted lines and connects to a pump 500 which connects with a reservoir 502, control valve 61 and cylinder 504. Piston rod 506 in the cylinder 504 has one end pivotally connected with tractor valve lever 56. Control valve 61, which is actuated by lever 56 and movement of piston rod 506, controls the vertical movement of blade 16 throughout the cycle of operations as described in the foregoing.

Various changes may be made in the details of construction without departing from the spirit or scope of the invention as defined by the claims.

I claim:

1. Earth blading apparatus including an ambulatory frame, ground engaging means supporting said frame, a blade having a support and being connected to said frame for movement between maximum blading limits generally vertically relative to said frame and the ground, said blade having a substantially fixed fore and aft location relative to said ground engaging means, means connected to said blade for raising and lowering the same between said maximum blading limits, and a control device connected with said raising and lowering means and having cyclically operating elements therein for limiting movement of said blade generally vertically through increments of its vertical movement in a cycle in successively opposite directions, and means in said control device connected to and limiting the increments of movement of said raising and lowering device, said movement limiting means being set for operating relative to the fore and aft location of said blade relative to said ground engaging means.

2. Earth blading apparatus including an ambulatory frame, a blade having a support connected to said frame for movement generally vertically between maximum blading limits, means connected to said blade for raising and lowering the blade between said maximum blading limits, and a control device connected with said raising and lowering means and having cyclically operating elements for moving said blade generally vertically through increments of its maximum blading limits in a cycle in successively opposite directions said operating elements being successively movable through a cycle of increments of movement proportional to the initial increments of movement in the cycle.

3. Earth blading apparatus including an ambulatory frame, a blade having a support connected to said frame and movable generally vertically between maximum blading limits, means connected to said blade for raising and lowering the blade between said maximum blading limits, a control device connected with said raising and lowering means and having cyclically operating elements for moving said blade generally vertically through increments of its maximum blading limits in a cycle in successively opposite directions, and said control device including means engaging and movable over the ground with travel of said ambulatory frame and connected to the remainder of said control device for timing the cycle of operation of said cyclically operating elements.

4. Earth blading apparatus including an ambulatory frame, means for moving the frame over the ground, a blade having a support connected to said frame for movement generally vertically between maximum blading limits, means connected to said blade for raising and lowering the blade between said maximum blading limits, a control device connected with said raising and lowering means and having cyclically operating elements for moving said blade generally vertically through increments of its maximum blading limits in a cycle in successively opposite directions, and said control means including a cycle timer connected to said blade raising and lowering means and connected to said means for moving the frame to operate the timer in proportion to the speed of travel of said frame over the ground.

5. Earth blading apparatus including an ambulatory frame, means for moving the frame over the ground including ground engaging means supporting said frame fore and aft, a blade having a support connected to said frame for movement between maximum blading limits generally vertically relative to said frame and the ground, means connected to said blade for raising and lowering the same between said maximum blading limits, and a control device connected with said raising and lowering means having cyclically operating elements for limiting movement of said blade generally vertically through increments of its vertical movement in a cycle in successively opposite directions, said control device including a cycle timer connected to said means for moving the frame to operate the timer in increments of vertical blade movement proportional to the fore and aft location of said blade relative to said fore and aft ground engaging means.

6. Earth blading apparatus including an ambulatory frame, means for moving the frame over the ground including ground engaging means supporting said frame, a blade having a support connected to said frame and movable between maximum blading limits generally vertically relative to said frame and the ground, said blade being located forwardly of said ground engaging means, means connected to said blade for raising and lowering the same between said maximum blading limits, and a control device connected with said raising and lowering means and having cyclically operating elements for limiting movement of said blade generally vertically through increments of its vertical movement in a cycle in successively opposite directions, and said control device including a cycle timer connected to said means for moving the frame to operate the timer in increments of vertical blade movement proportional to the forward location of said blade relative to said ground engaging means.

7. Earth blading apparatus including an ambulatory frame, a blade having a support connected to said frame for movement between maximum blading limits generally vertically relative to said frame and the ground, raising and lowering means connected to said blade, a timing and a control device connected with said raising and lowering means and including a timer and movement control for said raising and lowering means operatively connected to said blade to move the blade in a timed cycle of opposite alternate increments of its vertical movement, and a starter connected with said control device to initiate its cycle of vertical movement.

8. Earth blading apparatus including an ambulatory frame, a blade having a support connected to said frame for movement between maximum blading limits generally vertically relative to said frame and the ground, raising and lowering means connected to said blade, a timer and movement control device connected with said raising and lowering means and operable relative to movement of the apparatus over the ground to control the movement of said raising and lowering means and the blade in a timed cycle of opposite alternate increments of its vertical movement, and a starter connected with said control device to initiate its cycle of vertical movement, said starter having a variable interval of activation, the initial blade moving step of the control device in one vertical direction of movement of the blade at the beginning of a timed cycle being controlled by the interval of actuation of the starter, the control device being operable through a complete cycle of increments of vertical blade movement, and means in said control device for completing the cycle of increments of vertical blade movements in proportion to the initial blade movement determined by the starter.

9. Earth blading apparatus including an ambulatory frame, a blade connected to the frame for movement between maximum blading limits and generally vertically relative to said frame and the ground, raising and lowering means connected to said blade, means for initially positioning said blade in a predetermined vertical position relative to the ground, a control device connected to said blade raising and lowering means and operable to move the blade in opposite directions in proportional increments of its maximum vertical movement in a cycle of operation of the control device, and said control device having a variable period starter connected thereto and activated through the first movement of a cycle of blade movements to time the period of said first movement of a cycle of blade movements.

10. Earth blading apparatus according to claim 1 additionally comprising means responsive to a slowing of the apparatus caused by overloading thereof for raising said blade, means for arresting the blade raising when apparatus speed is restored by removal of the overloading on said blade by the raising thereof, and means for automatically initiating a new cycle of blade lowering and raising in response to restoration of normal operating speed of said apparatus.

References Cited in the file of this patent

UNITED STATES PATENTS

| | | |
|---|---|---|
| 2,502,217 | Guibor | Mar. 28, 1950 |
| 2,778,130 | Gurries et al. | Jan. 22, 1957 |
| 2,965,990 | Colee | Dec. 27, 1960 |
| 3,005,275 | Febre | Oct. 24, 1961 |